(12) United States Patent
Piumarta

(10) Patent No.: US 8,807,582 B1
(45) Date of Patent: Aug. 19, 2014

(54) REINFORCED SKATEBOARD DECK

(71) Applicant: NHS, Inc., Santa Cruz, CA (US)

(72) Inventor: Timothy Piumarta, Soquel, CA (US)

(73) Assignee: NHS, Inc., Santa Cruz, CA (US)

( * ) Notice: Subject to any disclaimer, the term of this patent is extended or adjusted under 35 U.S.C. 154(b) by 0 days.

(21) Appl. No.: 13/863,669

(22) Filed: Apr. 16, 2013

Related U.S. Application Data

(63) Continuation of application No. 13/342,799, filed on Jan. 3, 2012, now Pat. No. 8,419,026, which is a continuation of application No. 12/830,298, filed on Jul. 3, 2010, now Pat. No. 8,087,681, which is a continuation of application No. 11/940,233, filed on Nov. 14, 2007, now Pat. No. 7,748,725.

(51) Int. Cl.
*A63C 17/01* (2006.01)

(52) U.S. Cl.
USPC .................................................. 280/87.042

(58) Field of Classification Search
USPC ........................................ 280/87.041–87.042
See application file for complete search history.

*Primary Examiner* — Jeffrey J Restifo
*Assistant Examiner* — Erez Gurari
(74) *Attorney, Agent, or Firm* — Advantage IP Law Firm

(57) ABSTRACT

A reinforced skateboard deck providing a rupture resistant region and a protective region to inhibit degradation of the rupture resistant region during use is disclosed herein.

14 Claims, 3 Drawing Sheets

APPLY ADHESIVE AND MAKE STACK READY TO GO TO PRESS

KEEP WOOD FRAME

DISCARD

REINFORCED SKATEBOARD DECK

This is a continuation application of U.S. Ser. No. 13/342,799, now U.S. Pat. No. 8,419,026, filed on Jan. 3, 2012, which is a continuation of U.S. Ser. No. 12/830,298, now U.S. Pat. No. 8,087,681, filed on Jul. 3, 2010, which is a continuation of U.S. Ser. No. 11/940,233, now U.S. Pat. No. 7,748,725, filed on Nov. 14, 2007, all of which are entitled Reinforced Skateboard Deck and hereby incorporated by reference in their entireties.

BACKGROUND OF THE INVENTION

1. Field of the Invention

The present invention relates to the field of skateboard decks, and more specifically, to skateboard decks incorporating destructive force resistant materials.

2. Background

Skateboards are typically used today to ride up, over, and off of ramps and other structures, and the skateboard deck undergoes considerable stress when the rider and skateboard return to the ground. Skateboard decks have been strengthened by a laminated structure typically a seven-ply hardwood with the grain direction of the plies varied to provide strengthening in more than one direction. Such laminate decks are still subject to failure under significant impacts during typical skateboarding use. It is believed that a common failure of the laminate deck occurs where the top layer of the laminate will fail in tension when loaded, then the second sub-layer below that will in turn fail in tension, and then the next and next, working from the top of the deck to the bottom surface.

Skateboard decks have also been provided with fiber reinforcement, typically a fiberglass and resin matrix such as epoxy or other thermosetting resin. Fiber reinforced skateboards are known in the art, with some designs placing the fiber reinforcement between the hardwood veneer layers, while other designs have the fiber on the bottom or top major surface of the skateboard. It is believed that the location where a fiber reinforcement has the greatest effect in strengthening against common failure-inducing loads is the top major surface of the skateboard. When fiber reinforcement is placed in such a way as to be firmly and permanently adhered to the top major surface of the skateboard, the common failure mode is prevented from initiating. This is believed to be because the tensile load is distributed over not only the laminate structure of hardwood veneers, but also by augmenting the strength of the laminate structure by the fiber and resin matrix reinforcement. Propagation of rupture of the laminated hardwood veneers is believed to be reduced, because the fibers are both adding stiffness to the structure, and adding overall tensile strength to the skateboard.

Providing a layer of fiber reinforcement over the entire major surfaces of the skateboard deck has practical drawbacks given the common nature of use of skateboards where the edges of the deck are worn away by contact with the ground. The result of such contact and wearing away is that fibers are exposed at the edge of the deck. These exposed fibers, particularly in the case of glass or carbon fiber can be rigid and sharp. In the case of other fibers, such as aramid, or para-aramids or other engineering thermoplastic fibers, the exposed fibers are typically soft and pliable, but in any case create a cosmetically unattractive edge.

Therefore, what is needed and heretofore unavailable is a reinforced skateboard deck constructed to resist destructive forces typically occurring during use while protecting the reinforcing elements from wear and tear.

SUMMARY OF THE INVENTION

In accordance with a preferred embodiment constructed in accordance with the principles of the present invention, a multi-layer board with an intermediate section having a pair of opposing lateral edge sidewalls between a tail section and a nose section and an undersurface constructed to receive at least one set of trucks may include a rupture resistant layer extending at least partially through the intermediate section with a first region and a second region of the rupture resistant layer cooperating to form at least a portion of a dual density, exposed, foot bearing surface, with the first region including a fiber-reinforced material having a pair of outermost lateral edges spaced interior to the opposing lateral edge sidewalls of the intermediate section to form a recess at least partially occupied by the second region to define a first region protective barrier to prevent wear of the first region when the board slides along at least one of the opposing lateral edge sidewalls in use.

In another aspect of the present invention, the reinforced region includes a spacer layer.

In yet another aspect of the present invention, the reinforced region and the protective side barrier form complementary portions of the exposed foot bearing surface.

Methods for constructing a reinforced skateboard deck are disclosed as well.

Other aspects of the present invention will become apparent with further reference to the following drawings and detailed description.

DETAILED DESCRIPTION OF THE PREFERRED EMBODIMENTS

Figure 1:
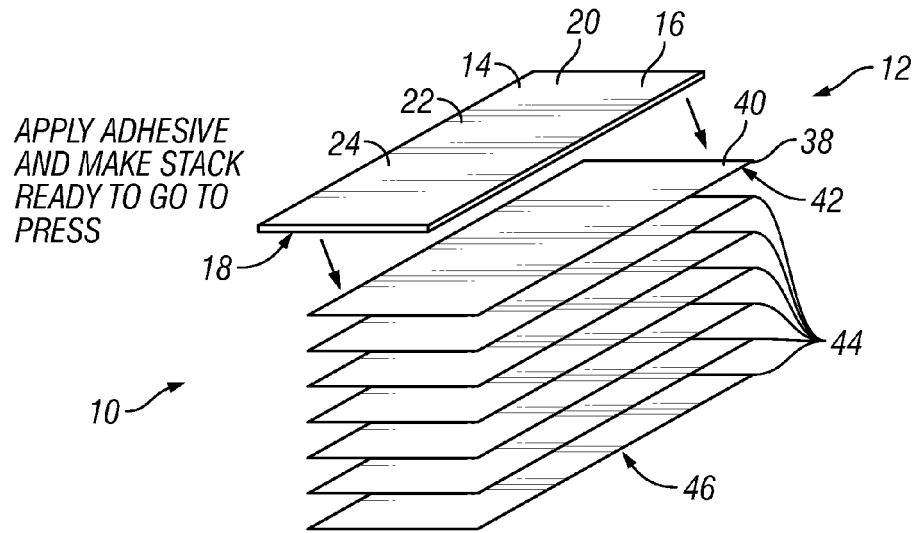
FIG. 1 is a perspective view of the layers of a skateboard deck in accordance with an embodiment of the present description, showing an upper layer formed of a fiber-reinforced layer inlaid within a veneer, and six additional layers, with varying strand orientations, prepared for assembly.

As shown in FIG. 1, a skateboard deck, indicated generally at 10, is typically formed of a series of wood veneer layers 12, which are stacked and assembled together. Alternatively, other suitable materials, such as thermoplastics, and non-layered constructions may be used.

An upper layer 14 provides a top surface 16 and a bottom surface 18. The top surface is typically the top structural (riding or foot bearing) surface of the skateboard deck, although a grip tape or other similar layer may be applied over the top surface. Upper layer 14 includes an inlaid, fiber-reinforced layer 20 that provides a portion of top surface 16.

Fiber-reinforced layer 20 is typically formed substantially of woven para-aramid fibers. The fiber-reinforced layer may be made with unidirectional or bi-directional para-aramid fibers loosely woven into a fabric. As an example, layer 20 may include Kevlar® RTM (resin transfer molded) fabric encased in an adhesive matrix. As an example, the Kevlar® fabric may be substantially saturated with polyurethane, which is then allowed to harden before further processing. Other components of the adhesive matrix would include a resin of epoxy or polyvinyl.

Fiber-reinforced layer 20 defines an edge 22 (see also FIG. 5), and typically has an oval or racetrack shape, although other shapes may be used as desirable for a particular skateboard design.

Upper layer 14 typically includes a side barrier 24 that also provides a portion of top surface 16. Preferably, the side barrier and the fiber-reinforced layer together provide the entire top surface but alternatively other structure may provide a part of the top surface. Also preferably, the side barrier extends around the entire edge of the fiber-reinforced layer. Alternatively, the side barrier extends around only a portion of the edge of the fiber-reinforced layer, in which case some other structure may run alongside a portion of the fiber-reinforced layer or no structure as suitable to the desired skateboard design. The side barrier is typically a wood veneer, and as such includes the fibrous material that is naturally found in wood, however, the side barrier typically does not include any fiber reinforcement such as to leave behind a fringe or sharp edge of fibers as may be the case with Kevlar® or glass or carbon fibers. Alternatively, side barrier 24 may be formed from a thermoplastic sheet.

Figure 2:
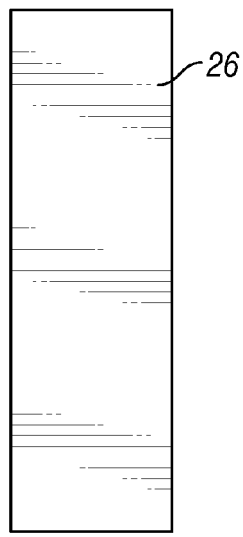
FIG. 2 is a top plan view of the veneer for the upper layer prior to an initial cutting, showing a typical dimension.
Figure 3:
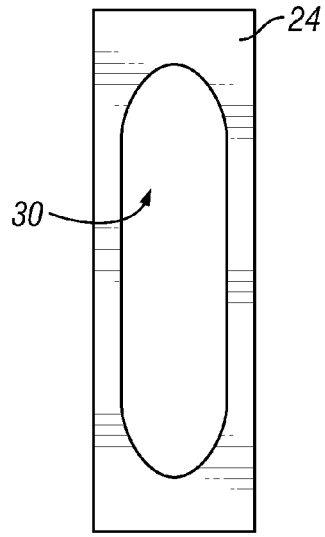
FIG. 3 is a top plan view of the veneer of FIG. 2 with a central portion removed to provide a side barrier defining a central opening.
Figure 3:
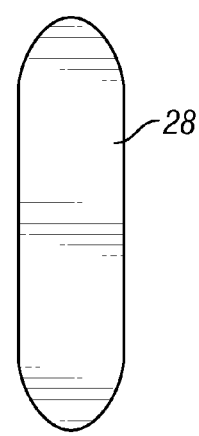

As best seen in FIGS. 2 and 3, side barrier 24 is made by starting with a wood veneer blank 26 from which a central portion 28 is removed to provide a central opening 30, typically in an oval or racetrack shape, but alternatively with any shape suited to the specific skateboard. Thus, central opening 30 is defined by side barrier 24.

Figure 4:
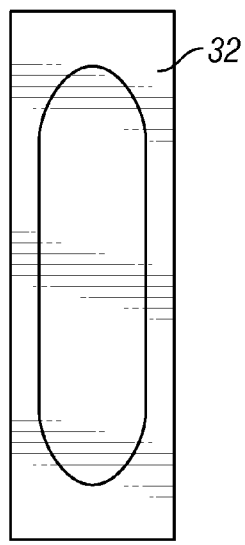
FIG. 4 is a top plan view of the fiber-reinforced layer for the upper layer, showing a typical dimension, prior to an initial cutting.
Figure 5:
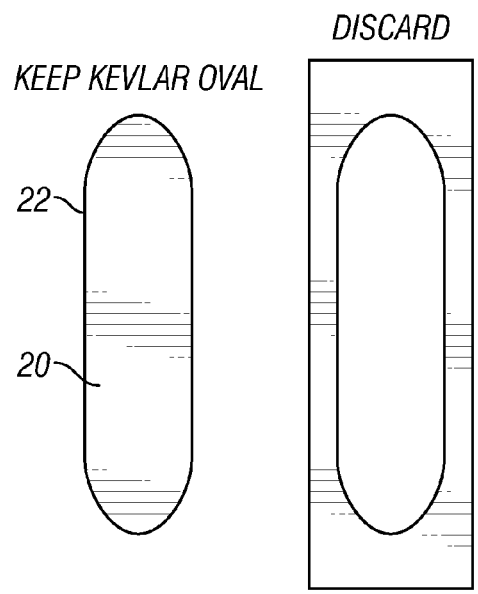
FIG. 5 is a top plan view of the fiber-reinforced layer, after cutting to a typical shape, to fit the layer into the central opening of the side barrier.

As best seen in FIGS. 4 and 5, fiber-reinforced layer 20 is made by starting with a sheet of woven Kevlar® fabric 32 encased in an adhesive matrix, such as by substantial saturation with polyurethane. Sheet 32 is cut into an oval racetrack, or other suitable shape to produce layer 20, which is preferably closely fitted for central opening 30 of side barrier 24 (see FIG. 6).

Side barrier 24 and fiber-reinforced layer 20 are preferably die cut from blank 26 and sheet 32, respectively, but any suitable means may be used. With die-cutting, the same press and die may be used to cut both the blank and the sheet. Side barrier 24 and fiber-reinforced layer 20 are typically of equal thickness although some variation is permitted. Alternatively, the fiber-reinforced layer may be substantially thinner, with the difference made up by a spacer layer 34 (see FIGS. 8 and 9), typically of the same shape, such as oval, as fiber-reinforced layer 20. Spacer layer 34 may be affixed, e.g., by adhesive, to the bottom surface of fiber-reinforced layer 20, and may be cut to shape either separately or together with the fiber-reinforced layer.

Figure 6:
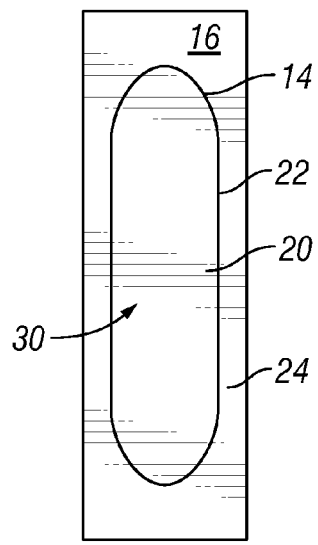
FIG. 6 is a top plan view of the fiber-reinforced layer and the side barrier assembled to provide the upper layer.
Figure 7:
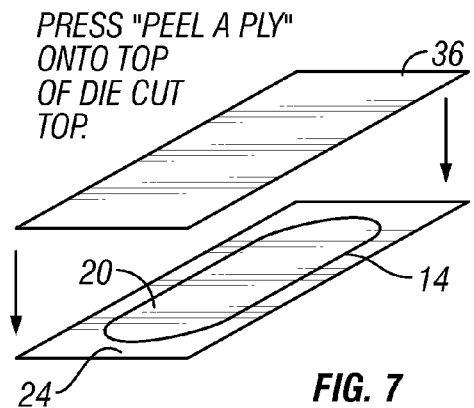
FIG. 7 is a perspective view of a removable adhesive tape being applied to the fiber-reinforced layer and the side barrier to hold them together.

As shown in FIGS. 6 and 7, after fiber-reinforced layer 20 and side barrier 24 are combined by placing layer 20 within central opening 30, they may be temporarily held together by application of an adhesive tape 36, e.g., the Peel A Play tape made by the R Tape Corporation of New Jersey. Adhesive tape 36 may be applied by a heat transfer press.

Figure 8:
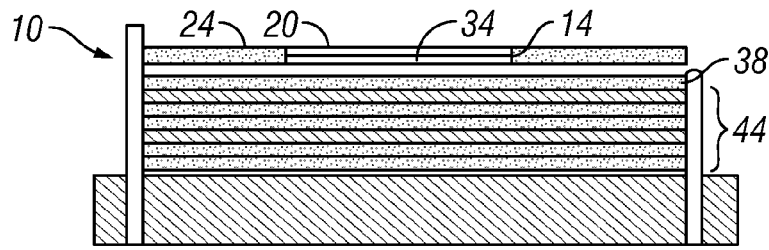
FIG. 8 is an end elevation view of the layers arranged together, including a spacer layer beneath the fiber-reinforced layer, showing a typical dimension.
Figure 9:
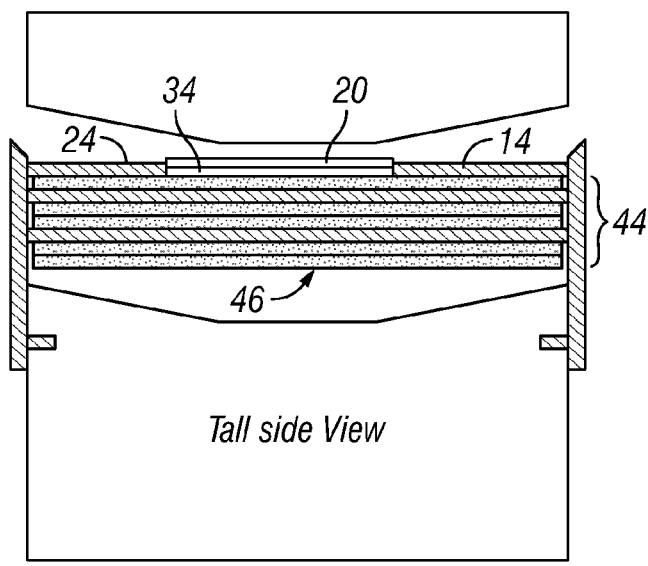
FIG. 9 is an end elevation view of a mold pressing the layers together to form a blank skateboard deck which may subsequently be cut to a desired size and shape.

As best seen in FIGS. 1, 8, and 9, skateboard deck 10 may include a first lower layer 38, typically a wood veneer, defining an upper surface 40 and a lower surface 42. Upper layer 14, comprising side barrier 24 and fiber-reinforced layer 20, is affixed, typically by application of adhesive and subsequent press molding at suitable heat and temperature, to first lower layer 38. Additional lower layers may be included as desired in consideration of desired weight and strength factors. For example, second, third, fourth, fifth, sixth, and seventh lower layers 44, with ultimate bottom surface 46, may be affixed successively beneath the first lower layer, typically by application of adhesive and subsequent press molding at suitable heat and temperature.

Typically the lower layers are wood or other structural material with a strand orientation that is varied from layer to layer. As an example, with seven lower layers, two may be oriented to provide maximum cross board strength, while the remaining five maximize along board strength, although this scheme will be varied as appropriate for the desired performance characteristics.

Figure 10:
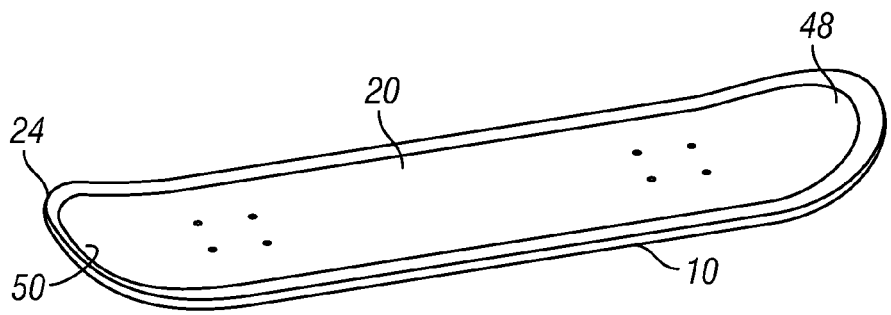
FIG. 10 is a perspective view of a skateboard deck press molded to provide a raised nose and tail and cut to a final desired shape.

FIGS. 1, 8, and, 9 also illustrate that fiber-reinforced layer 20 is inlaid within side barrier 14, and side barrier 14 preferably surrounds substantially all of edge 22 of fiber-reinforced layer 20. As shown in FIG. 10, skateboard deck 10 may be press-molded to provide a raised tail 48 and a raised nose 50 and cut to a final desired shape. Furthermore, deck 10 may be drilled for truck mounting holes, and then trucks, bearing and wheels may be mounted to provide a skateboard ready for riding. A grip tape or other suitable tape, stickers or the like may be affixed over the top surface. Preferably the upper surface of fiber-reinforced layer 20 and the upper surface of side barrier 24 are flush with one another, presenting a smooth transition with no visible step.

Alternatively, upper layer 14 may be formed substantially of an adhesive matrix including a central portion of woven fiber encased therein to provide the fiber-reinforced layer. In this embodiment, the adhesive matrix includes an outer portion without woven fiber to provide the side barrier.

As described herein, skateboard deck 10 includes a top (or foot bearing) surface 16 for the rider's feet, and a bottom surface 46 for the connection of trucks and wheels. The top surface is provided in part by a fiber-reinforced layer 20. The top surface is further provided by a side barrier 24 extending around at least a portion of the fiber-reinforced layer.

Typical thicknesses for the fiber-reinforced layer after saturation with polyurethanes are between about 0.010 to about 0.050-inches. Typical thicknesses for side barrier 14 are between about 0.040 to about 0.065-inches. The thickness of spacer layer 34 typically is adjusted to the appropriate thickness to accommodate the difference between fiber-reinforced layer 20 and side barrier 24 and provide a flush top surface 16. As an example, where side barrier 14 is 0.060-inches thick, and fiber-reinforced layer 20 is 0.020-includes thick, spacer layer 14 is preferably 0.040-inches in thickness. All of these dimensions may be varied within and beyond these ranges as suited to the particular skateboard design.

Side barrier 14 may have varying width dimensions relative to skateboard deck 10 and fiber-reinforced layer 20. The dimensions of the side barrier may be substantially uniform around the edge of the skateboard, or they may vary significantly as desired for specific skateboard characteristics. For example, the side barrier may be narrower along the sides as compared to the nose and tail. Side barrier 14 preferably has a minimum width of 0.125-inches along each long side of the skateboard. Side barrier 14 preferably has a width dimension between about 0.125-inches and about 6-inches adjacent the nose and tail of the skateboard. All of these dimensions may, be varied within and beyond these ranges as suited to the particular skateboard design. With this design, fiber-reinforced layer 20 is inset away from the edge of the skateboard, so that the fibers are shielded from contact when the skateboard edges are scraped on the ground or other surface. Fiber-reinforced layer 20 is preferably inlaid on top surface 16 of deck 10, and additionally or alternatively may be inlaid on lower surface 42.

It will be appreciated that the incorporation of the fiber-reinforced layer 20 and/or the fiber-reinforced layer as bonded to another layer of the deck assists in significantly resisting tensile forces commonly associated with use and improves the overall rupture resistance of the deck. When used at or near the top layer as a part thereof, the effectiveness of this rupture resistance feature increases.

While the present invention has been described herein in terms of a number of preferred embodiments for skateboard decks, various changes and improvements may also be made to the invention without departing from the scope thereof. The subject matter described herein includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

What is claimed is:

1. A method of constructing a reinforced skateboard deck comprising the steps of:
   providing a non-fiber-reinforced upper layer and at least one non-fiber-reinforced lower layer;
   removing a central portion of the upper layer to provide a central opening defined by a side barrier;
   providing a rupture resistant, fiber-reinforced layer to fit within the central opening of the side barrier;
   placing the fiber-reinforced layer within the central opening of the side barrier to form an exposed upper foot bearing surface defined by portions of the fiber-reinforced layer and the side barrier; and
   bonding the lower layer together with the side barrier and the fiber-reinforced layer to form a reinforced skateboard deck with a nose section, tail section, and intermediate section with opposing lateral edge sidewalls therebetween with at least a portion of the rupture resistant fiber-reinforced layer disposed in the intermediate section.

2. The method claim 1 further comprising the step of:
saturating the fiber-reinforced layer in polyurethane before the bonding step.

3. The method of claim 1 further comprising the step of:
die cutting the upper layer to form the central opening.

4. The method of claim 1 further comprising the step of:
pressing the bonded layers together to form a skateboard deck having a raised nose section and raised tail section.

5. The method of claim 1 further comprising the step of:
inserting and bonding a spacer element between the fiber-reinforced layer and an adjacent layer.

6. The method of claim 1 further comprising the step of:
providing at least one more fiber-reinforced layer beneath the exposed fiber-reinforced foot bearing surface.

7. The method of claim 1 further comprising the step of:
providing at least one additional layer between the foot bearing surface and an undersurface of the lower layer to fit within the central opening of the side barrier.

8. The method of claim 1 further comprising the step of:
extending the central opening from the foot bearing surface to an undersurface of the lower layer.

9. The method of claim 1 further comprising the step of:
providing a plurality of rupture resistant layers to fit within the central opening of the side barrier.

10. The method of claim 9 further comprising the step of:
spacing apart at least two of the rupture resistant layers.

11. The method of claim 1 further comprising the step of:
forming discrete regions in the rupture resistant layer within the central opening of the side barrier.

12. The method of claim 1 further comprising the step of:
bonding a secondary rupture resistant, fiber-reinforced layer to the undersurface of the lower layer.

13. The method of claim 1 further comprising the step of:
bonding a secondary rupture resistant, fiber-reinforced layer within a recess formed in the undersurface of the lower layer.

14. The method of claim 1 further comprising the step of:
defining a lowermost truck mounting surface with spaced apart truck mounting regions on the lower layer.

\* \* \* \* \*